United States Patent
MacDonald

(10) Patent No.: US 6,706,697 B1
(45) Date of Patent: Mar. 16, 2004

(54) DIABETIC NUTRITION AND WEIGHT LOSS DRINK COMPOSITIONS

(75) Inventor: Bradley T. MacDonald, Owings Mills, MD (US)

(73) Assignee: Jason Pharmaceuticals, Inc., Owings Mill, MD (US)

( * ) Notice: Subject to any disclaimer, the term of this patent is extended or adjusted under 35 U.S.C. 154(b) by 0 days.

(21) Appl. No.: 10/246,410

(22) Filed: Sep. 19, 2002

(51) Int. Cl.⁷ .................. A61K 31/715; A61K 31/717; A23L 1/305; A23L 1/304; A23L 1/302
(52) U.S. Cl. .................. 514/57; 514/866; 536/56; 536/123.1; 536/114; 426/648; 426/590; 426/72; 426/74; 426/656; 426/658
(58) Field of Search .................. 514/57, 866; 536/114, 536/56, 123.1; 426/648, 590, 72, 74, 102, 656, 658

(56) References Cited

U.S. PATENT DOCUMENTS

| | | |
|---|---|---|
| 3,653,912 A | 4/1972 | Koski et al. |
| 4,687,782 A | 8/1987 | Brantman |
| 4,737,364 A * | 4/1988 | Kalogris |
| 5,002,779 A | 3/1991 | Mehansho et al. |
| H1620 H | 12/1996 | Dolan et al. |
| 5,641,531 A | 6/1997 | Liebrecht et al. |
| 5,858,449 A | 1/1999 | Crank et al. |
| 5,968,896 A | 10/1999 | Bell et al. |
| 5,985,339 A | 11/1999 | Kamarei |
| 6,071,547 A | 6/2000 | Schechter |
| 6,150,399 A | 11/2000 | Patel et al. |
| 6,241,996 B1 | 6/2001 | Hahn |
| 6,248,375 B1 * | 6/2001 | Gilles et al. |
| 6,365,176 B1 * | 4/2002 | Bell et al. |
| 6,372,782 B1 | 4/2002 | Patel et al. |
| 6,413,545 B1 * | 7/2002 | Alviar et al. |
| 2001/0018066 A1 | 8/2001 | Hahn |
| 2002/0039619 A1 | 4/2002 | Monagle |

FOREIGN PATENT DOCUMENTS

WO WO 97/37547 10/1997

* cited by examiner

*Primary Examiner*—James O. Wilson
*Assistant Examiner*—Michael C Henry
(74) *Attorney, Agent, or Firm*—Richard C. Litman

(57) ABSTRACT

A diabetic nutrition and weight loss drink powder composition comprising a major amount of isolated soy protein, milk protein isolate, and fructose; a minor amount of inulin, guar gum, potassium chloride, microcrystalline cellulose, and flavoring selected from the group of strawberry, vanilla and chocolate; and a minute amount of a 24 vitamin and mineral mixture, D,L-methionine, magnesium oxide, a dried cream extract, coloring, precipitated silicon dioxide, and acesulfame potassium salt; whereby addition of the composition to water results in a tasteful, nutritious drink for diabetic people.

2 Claims, No Drawings

DIABETIC NUTRITION AND WEIGHT LOSS DRINK COMPOSITIONS

BACKGROUND OF THE INVENTION

1. Field of the Invention

The present invention relates generally to nutritional drink compositions. More specifically, the invention is a powdered food supplement that is mixed with water to prepare a liquid drink for diabetic people in order to maintain proper nutrition and weight management, while controlling and stabilizing blood sugar levels.

2. Description of the Related Art

The related art of interest describes various nutritional liquid compositions, but none discloses the present invention. There is a distinct need for diabetic people to have nutritious flavored drink compositions that help maintain blood sugar levels and which will not add excessive calories, but still have adequate nutritional value and an attractive taste. The related art will be discussed in the order of perceived relevance to the present invention.

U.S. Pat. No. 6,241,996 B1 issued on Jun. 5, 2001, to Douglas E. Hahn and a corresponding U.S. Patent Application Publication No. U.S. 2001/0018066 A1 published Aug. 30, 2001, describe liquid soy products for oral and enteral administration comprising (1) 4–10 wt. % soybean protein isolate or 1–5 wt. % soy protein concentrate; (2) 18–30 wt. % of a carbohydrate having a dextrose equivalent of 20–30 selected from corn syrup, corn syrup solids, maltodextrin, fructose, sucrose, glucose, and mixtures thereof; (3) up to 0.5 wt. % gum selected from kappa, iota or lambda carrageenan, guar gum, locust bean gum, and mixtures thereof; (4) 0.05–0.30 wt. % trimagnesium phosphate as a protein stabilizer; (5) vitamins, minerals, flavors, fiber, sweeteners, coloring agents, antibiotics, enzymes, bulking agents, medicaments, and mixtures thereof; and (6) water. The compositions are distinguishable for requiring trimagnesium phosphate, and are not designed for diabetic people.

U.S. Pat. No. 5,985,339 issued on Nov. 16, 1999, to A. Reza Kamarei describes refrigeration-shelf-stable and ready-to-drink complete nutritional compositions comprising (a) 10–25% of daily carbohydrate; (b) 5–40% of the daily value of protein; (c) 20–50% of the daily value of vitamins A, B6, B12, D, and K, thiamine, riboflavin, niacin, folate, biotin, pantothenic acid, phosphorus, iodine, magnesium, zinc, selenium, copper, manganese, chromium, and molybdenum; (d) 5–25% of daily requirement of potassium; (e) 0.1–20% of daily requirement of sodium; (f) 20–80% of vitamins C and E, and calcium; and (g) 5–40% of daily value of chloride; and (h) wherein the total calorie content is 5–20% of the daily value based on a 2,000 calorie diet. The composition is distinguishable for being limited to a refrigerated composition, and being based on a rigid daily calorie diet.

U.S. Pat. No. 6,150,399 issued on Nov. 21, 2000, and U.S. Pat. No. 6,372,782 B1 issued on Apr. 16, 2002, to Gauravkumar C. Patel et al. describe calcium enriched soy-based nutritional products comprising (1) at least 0.7 mg. isoflavones/gm. soy protein, (2) at least 0.5 mg. genistein (an isoflavone)/gm. soy protein, (3) at least 35% of the Recommended Dietary Allowances (RDI) of calcium and a soluble calcium source less than 100 ppm, (4) a lipid system containing 20% corn oil, 40% oleic safflower oil, and 40% canola oil; (5) a stabilizer system containing 1500–2500 ppm cellulose gel and carrageenan; (6) a carbohydrate system containing 35–40% corn syrup, 15–22% maltodextrin, and 43–45% sucrose; (7) vitamins A, B1, B2, B6, B12, C, D, E, K, beta-carotene, biotin, folic acid, pantothenic acid, niacin, and choline; and (8) minerals magnesium, potassium, sodium, phosphorous, iron, zinc, manganese, copper, iodine, chromium, molybdenum, and selenium. The dietary compositions are distinguishable for their emphasis on calcium and carbohydrates.

U.S. Patent Publication No. 2002/0039619 A1 published on Apr. 4, 2002, for Charles W. Monagle describes a liquid or dry nutritional food product comprising (a) at least 60% soy protein; (b) a combined monosaccharide and sucrose content of at least 10% of dry matter; (c) a combined raffinose and stachyose content of less than 5% of dry matter; and (d) being free of glactinol. The soy is not from low oligosaccharide soybeans. The product is treated with an enzyme such as alpha-glycosidase. The food product is distinguishable for requiring enzyme processing.

U.S. Statutory Invention Registration No. H1620 published on Dec. 3, 1996, for Kenneth M. Dolan et al. describes a dry chocolate flavored beverage mix composition comprising by weight %: (a) 3–13% cocoa powder; (b) 40–60% sucrose; (c) 3–5% caramel powder; (d) 10–20 malt extract; (e) 0.25–1.0% sodium chloride; (f) 10–32% powdered non-dairy creamer containing 40–60% vegetable fat; (g) 0.02% carboxymethylcellulose; (h) up to 1.0% lecithin; (i) an effective amount of an antioxidant such as butylated hydroxyanisole, butylated hydroxytoluene and mixtures thereof; (j) up to 6% water; (k) up to 6% of a protein source such as soy protein concentrate, soy protein isolate, pea protein, corn protein, rice protein, lactalbumin, casein, whey solids, dehydrated milk powder, non-fat milk powder, and whey protein concentrate; (1) vitamins A, C, D, E, thiamine, riboflavin, niacin, pantothenic acid, and folic acid; and (m) minerals such as iron, iodine, calcium, magnesium, zinc, potassium, and phosphorous. The composition is distinguishable for requiring large contents of sugar and malt.

U.S. Pat. No. 3,653,912 issued on Apr. 4, 1972, to William E. Koski et al. describes a dispersed soy product in water beverage prepared by adding to soy milk, sodium hydroxide, ammonium hydroxide, ammonia or tri-sodium phosphate to raise the pH to 12 and adding citric acid or phosphoric acid to reduce the pH to 7 or 8. The solution is spray dried to a powder and added to milk, orange juice or water to form the beverage. The soy product is distinguishable for requiring acid and base treatment of soy milk.

U.S. Pat. No. 5,858,449 issued on Jan. 12, 1999, to Donald L. Crank et al. describes an isoflavone-enriched soy protein composition for addition to infant formulas, nutritional beverages, milk replacements, soy extended bolognas, imitation processed cheese spreads, water-injected hams, yogurts, and frozen desserts. The primary object of the processing of soy protein isolate was to reduce the objectionable soy taste. The manufacturing process requires numerous heating and solids separation steps to obtain the desired product with less soy taste. The composition is distinguishable for being limited to a processed soy product.

U.S. Pat. No. 4,687,782 issued on U.S. Pat. No. 4,687,782, to Eugene R. Brantman describes a nutritional composition of enhancing skeletal muscle adapted to exercise training comprising an aqueous amino acid mixture consisting of (1) 0.7 to 1.8 wt. % carnitine; (2) 8–3.4 wt. % glutamine; (3) 23.2 to 31.2 wt. % isoleucine; (4) 23.6 to 31.2 wt. % valine; (5) proteins such as casein, soy protein and lactalbumin; (6) carbohydrates such as syrup solids and sucrose; (7) fats such as sunflower oil, soybean oil and a triglyceride; (8) vitamins B1, B2, B6, B12, C, niacin, biotin, choline, and pantothenate; and (9) minerals such as sodium, magnesium, potassium, calcium, phosphate, and chloride. The composition is distinguishable for requiring an amino acid mixture, carbohydrates and fats.

U.S. Pat. No. 5,968,896 issued on Oct. 19, 1999, to Stacey J. Bell et al. describes a nutritional supplement composition in the form of a non-baked extruded bar for preoperative feeding containing (1) 10–75 gm. carbohydrate (corn syrup, corn starch, sugars, etc.); (2) 5–50 gm. protein (whey, egg, soy protein, and soy protein isolate); (3) 3–30 gm. fats and oils (soybean oil, butter, canola oil, corn oil, sesame seed oil, olive oil, fish oil, etc.) ; and (4) a therapeutic amount of an antioxidant, i.e., vitamins A, C and E. The solid composition is distinguishable for required high amounts of carbohydrates, oils and fats.

U.S. Pat. No. 5,002,779 issued on Mar. 26, 1991, to Haile Mehansho et al. describes a dry stable chocolate beverage containing iron and vitamin C. The iron source is ferrous fumarate, ferrous succinate or iron-sugar complexes such as ferrous fumarate, ferrous succinate, ferrous sucrate-malate, iron fructate-malate, iron sucrate-citrate, iron fructate-ascorbate or mixtures thereof. The primary vitamin is ascorbic acid, and optionally vitamins A, B, D and E. Other minerals include calcium, zinc and copper. The beverage contains dry mild solids such as up to 25% non-fat milk solids, 0.05%–20% cocoa or chocolate solids and 0.5%–85% sweetener. Less than 5% water and 5% total fat is contained. The composition is distinguishable for requiring a high content of iron and sugar, and lacking soy products.

U.S. Pat. No. 5,641,531 issued on Jun. 24, 1997, to Jeffrey W. Liebrecht et al. describes a clear liquid nutritional supplement beverage containing 1–10 Wt. % whey protein isolate, carbohydrate (sucrose, glucose, maltodextrin, fructose, and corn syrup solids), vitamins, trace minerals, and acidified by a mixture of hydrochloric acid, malic acid and citric acid to a pH of 2.8–3.3. The composition is distinguishable for lacking soy.

U.S. Pat. No. 6,071,547 issued on Jun. 6, 2000, to Steven M. Schechter describes a dry mix formulation for a nutritional drink having (1) 15–30 wt. % protein (spray dried sweet dairy whey); (2) 15–30 wt. % of low melting fat, sodium caseinate and corn syrup solids; (3) 0.1 wt. % vegetable gum (carboxymethyl-cellulose); (4) 0.1–1 wt. % dispersant (soya lecithin); (5) 40–60 wt. % carbohydrate (corn syrup); (6) 1–3 wt. % (malic acid, tartaric acid, fumaric acid, and citric acid); and optionally (7) vitamins and minerals. The composition is distinguishable for requiring large amounts of dairy whey and fats.

PCT Patent Publication No. WO 97/37547 published on Oct. 16, 1997, for Donald L. Grant et al. describes an isoflavone-enriched soy protein product and its method of manufacture. The composition comprises an isoflavone-enriched soy protein product having a low stachyose and high sugar flour content which is an ingredient in the production of dairy or meat based food products such as an infant formula, nutritional beverage, milk replacer, soy extended bologna, imitation processed cheese spread, water-injected ham, yogurt, and frozen dessert. The product composition is distinguishable for being limited to the isoflavone-enriched soy protein product having a high sugar flour content.

None of the above inventions and patents, taken either singularly or in combination, is seen to describe the instant invention as claimed. Thus, diabetic weight loss drink compositions solving the aforementioned problems is desired.

SUMMARY OF THE INVENTION

The present invention is directed to a dry, powdered, nutritious food supplement for diabetic people. The powdered food supplement drink is available in three different flavors, i.e., vanilla, strawberry, and chocolate. The food supplement powder is dissolved in water to form a drink mixture which contains a soy protein as its main ingredient and milk protein isolate, fructose and chicory inulin as secondary ingredients. Minor amounts of guar gum, microcrystalline cellulose, potassium chloride, sodium chloride, flavorings, D,L-methionine, magnesium oxide, dried cream extract, vitamin/mineral premixture, silica, beta-carotene, acesulfame potassium salt, and non-nutritive sweeteners are added. The packaged dry powdered food supplement drink has a shelf life of a minimum of one year when stored at less than 70° F. and less than 50% relative humidity.

Accordingly, it is a principal object of the invention to provide a nutritious and weight reducing food supplement composition for diabetic people.

It is another object of the invention to provide a nutritious food supplement composition containing a soy protein as its main ingredient with milk protein isolate, fructose and chicory inulin as secondary ingredients.

It is a further object of the invention to provide a nutritious flavored drink composition containing minor amounts of chicory Inulin, guar gum, microcrystalline cellulose, potassium chloride, sodium chloride (salt), DL-methionine, magnesium oxide, dried cream extract, vitamin/mineral premixture, silica, beta-carotene, and acesulfame potassium salt (a non-nutritive sweetener).

Still another object of the invention is to provide a nutritious food supplement composition in package form having a minimum shelf life of one year.

It is an object of the invention to provide improved elements and arrangements thereof for the purposes described which is inexpensive, dependable and fully effective in accomplishing its intended purposes.

DETAILED DESCRIPTION OF THE PREFERRED EMBODIMENTS

The present invention is directed to a liquid nutritious food supplement for diabetic people who must watch their caloric intake daily to maintain their blood sugar at a certain level, such as 110 to 150 mg./deciliter blood. This food supplement drink would enable diabetic people to enjoy tasty food with the knowledge that low glycemic carbohydrates were used in developing this product to aid in maintaining their blood sugar levels. The food supplement drink is packaged in powder form and can be prepared by mixing with water. At least three different flavors such as vanilla, strawberry, and chocolate are provided to avoid monotonous consumption of a single flavor. The food supplement powder contains a soy protein as its main ingredient with milk protein isolate, fructose and chicory inulin as secondary ingredients. Minor amounts of guar gum, potassium chloride, salt, DL-methionine. magnesium oxide, dried cream extract, vitamin and mineral premixture, silica, beta-carotene, and acesulfame potassium salt (a non-nutritive sweetener) are included in the supplement. When the food supplement drink powder is packaged in aluminum coated paper envelopes, it has a shelf life of a minimum of one year when stored at less than 70° F. and less than 50% relative humidity.

Further and more complete objects and advantages of the present invention will become readily apparent by reference to the following specification and claims.

A representative specific formula for a strawberry drink composition is as follows.

| Amount/serving/gm. | Food Item | % Weight |
|---|---|---|
| 12.0 | Isolated soy protein | 43.95 |
| 5.8 | Milk protein isolate (milk whey) | 21.24 |
| 4.25 | Fructose | 15.56 |
| 2.4 | Chicory Inulin | 8.79 |
| 0.7 | Guar gum | 2.56 |
| 0.55 | Potassium chloride | 3.11 |
| 0.3 | Sodium chloride | 0.3 |
| 0.5 | Strawberry flavor | 1.83 |
| 0.35 | Microcrystalline cellulose | 1.28 |
| 0.1 | Vitamin/Mineral Premix - Fortitech | 0.37 |
| 0.09 | D,L-methionine | 0.33 |
| 0.09 | Magnesium oxide | 0.33 |
| 0.05 | Dried cream extract | 0.18 |
| 0.0065 | FD & C Red #40 coloring | 0.02 |
| 0.05 | Silicon dioxide (precipitated) | 0.18 |
| 0.07 | $C_4H_4NO_4KS$ as potassium acesulfame | 0.26 |

The nutrients in a packet for one serving of 27.31 gm. or 0.96 oz. are as follows: 87.09 calories, 14.22 gm. protein, 9.02 gm. carbohydrates, 3.03 dietary fiber, 5% calories from fat, 0.55 gm. total fat, 1,000 I.U. vitamin A, 21.74 mg. vitamin C, and 37% calories from the carbohydrate.

The specific identities of the brand products listed above are as follows:

Inulin is a powder mixture of oligosaccharide and polysaccharide composed of fructose and glucose units.

Milk protein isolate is a spray dried, soluble casein and whey proteins isolated from fresh skim milk.

The vitamin and mineral premix composition containing 24 essential items for a 100 mg. serving is as follows:

13 vitamins: 1,000 I.U. vitamin A as palmitate, USP; 0.45 mg. vitamin $B_1$ as thiamin mononitrate, USP-FCC; 0.51 mg. vitamin $B_2$ as riboflavin; 4.0 mg. vitamin $B_3$ as niacinamide; 0.60 mgm. vitamin $B_6$ as pyridoxine hydrochloride USP-FCC; 0.06 mgm. vitamin B complex as biotin; 2 mgm. vitamin B complex as pantothenic acid; 0.08 mgm. vitamin B complex as folate, USP-FCC; 1.2 mcgm. vitamin $B_{12}$ as cyanocobalamin, USP-FCC; 18 mgm. vitamin C as ascorbic acid, USP-FCC; 80 I.U. vitamin $D_3$ as cholecalciferol; 6 I.U. vitamin E as acetate, USP; and 15 mcgm. vitamin K as phytonadione, USP.

11 minerals: 3.0 mgm. iron as ferric orthophosphate, FCC; 3.0 mgm. zinc as zinc oxide; 0.4 mgm. copper as copper sulfate; 30.0 mcgm. iodine as potassium iodide, USP-FCC; 0.8 mgm. manganese as manganese sulfate, USP-FCC; 40 mcgm. molybdenum as sodium molybdate; 30 mcgm. chromium as chromium chloride, USP; 14 mcgm. selenium as sodium selenite; 0.09 mcgm. magnesium as magnesium oxide; and a sufficient quantity of calcium and phosphorous as dicalcium phosphate, FCC. It is noted that sodium and potassium have been added in the form of compounds described above, but is not included as an essential mineral.

The nutrient additive composition for diabetics incorporates low-glycemic carbohydrates that help maintain the low blood sugar levels required by a diabetic person. Proteins in the composition come from a source of the soy and milk additives, which incorporate all necessary amino acids that help maintain and repair muscles while building the drinker's immune system. The composition has the following advantages: (1) low in sugar, i.e. fructose, with less that 5 gm. per serving; (2) no cholesterol; (3) attractive taste with vanilla, chocolate and strawberry flavoring; (4) enriched with calcium, chromium and iron; (5) enriched with vitamins A, $B_1$, $B_2$, $B_6$, $B_{12}$, B complexes (folate and biotin), C, $D_3$, E, and $K_1$; (6) low caloric content of 90 calories per serving; (7) soluble fiber, 3 gm. per serving, which drops carbohydrate concentration and slows a diabetic person's digestion and absorption to prevent wide swings in blood sugar levels; (8) less than 1 gm. fat per serving; (9) low glycemic index; (10) high content of soy protein, 9 gm. per serving, which is beneficial for one's heart; (11) high content of protein, 14 gm. per serving, due to 9 gm. soy and 5 gm. milk; (12) low lactose content, less than 1 gm. per serving; and (13) chromium content improves glucose tolerance in diabetic persons.

The Glycemic Research Institute in Washington, D.C. has officially granted a seal of approval on Apr. 22, 2002, for these products, as a certified low glycemic product composition, with a license number of 1905, for diabetic persons.

The Nutrition and Health Research Clinic of Johns Hopkins Bloomberg School of Public Health is currently evaluating the efficacy of these compositions compared to a standard weight loss program in terms of changes in weight loss in overweight men and women over a 68 to 86 week long active weight loss and weight maintenance program.

The weight management supplement powder composition is packaged in aluminized paper packages, which have a shelf life of a minimum of a year at less than 70° F. and less than 50% relative humidity.

Thus, a packaged weight management supplement powder composition containing soy protein and milk protein isolate with specific flavoring such as strawberry, vanilla and chocolate has been presented to aid the diabetic person in weight reduction, and maintaining a low blood sugar level as well as supplying essential vitamins and minerals.

It is to be understood that the present invention is not limited to the embodiments described above, but encompasses any and all embodiments within the scope of the following claims.

I claim:

1. A diabetic nutritional and weight loss composition formulated as a powder, said composition comprising:
   about 44% by weight of isolated soy protein;
   about 20% by weight of milk protein isolate;
   about 15% by weight of fructose;
   about 10% by weight of inulin;
   about 3% by weight of guar gum;
   about 3% by weight of potassium chloride;
   about 2% by weight of flavoring;
   about 1% by weight of microcrystalline cellulose;
   about 0.3% sodium chloride;
   about 0.4% by weight of vitamin/mineral premix;
   about 0.3% by weight of D,L-methionine;
   about 0.3% by weight of magnesium oxide;
   about 0.2% by weight of dried cream extract;
   about 0.2% by weight of silicon dioxide; and
   about 0.2% by weight of potassium acesulfame.

2. A diabetic nutritional and weight loss composition formulated as a powder, said composition comprising:
   about 30% by weight of isolated soy protein;
   about 20% by weight of milk protein isolate;
   about 15% by weight of fructose;

about 10% by weight of inulin;
about 3% by weight of guar gum;
about 3% by weight of potassium chloride;
about 2% by weight of flavoring;
about 1% by weight of microcrystalline cellulose;
about 0.3% sodium chloride;
about 0.4% by weight of vitamin/mineral premix;
about 0.3% by weight of D,L-methionine;
about 0.3% by weight of magnesium oxide;
about 0.2% by weight of dried cream extract;
about 0.2% by weight of silicon dioxide; and
about 0.2% by weight of potassium acesulfame.

* * * * *